United States Patent
Ho et al.

(10) Patent No.: US 8,165,201 B2
(45) Date of Patent: Apr. 24, 2012

(54) METHOD OF COMPUTING DISPARITY, METHOD OF SYNTHESIZING INTERPOLATION VIEW, METHOD OF ENCODING AND DECODING MULTI-VIEW VIDEO USING THE SAME, AND ENCODER AND DECODER USING THE SAME

(75) Inventors: Yo Sung Ho, Gwangju (KR); Cheon Lee, Gwangju (KR); Kwan Jung Oh, Gwangju (KR); Byeong Ho Choi, Yongin-si (KR)

(73) Assignees: Gwangju Institute of Science and Technology, Gwangju (KR); KT Corporation, Seongnam (KR)

( * ) Notice: Subject to any disclaimer, the term of this patent is extended or adjusted under 35 U.S.C. 154(b) by 1140 days.

(21) Appl. No.: 12/013,303

(22) Filed: Jan. 11, 2008

(65) Prior Publication Data
US 2008/0198924 A1   Aug. 21, 2008

(30) Foreign Application Priority Data
Feb. 6, 2007   (KR) .................. 10-2007-0012115

(51) Int. Cl.
*H04N 7/12*  (2006.01)
(52) U.S. Cl. ......... 375/240.02; 375/240.08; 375/240.12; 375/240.24

(58) Field of Classification Search .................. 375/240, 375/240.01, 240.02, 240.08, 240.12, 240.16, 375/240.24; 348/384.1
See application file for complete search history.

(56) References Cited

U.S. PATENT DOCUMENTS

| | | | |
|---|---|---|---|
| 7,671,894 B2 * | 3/2010 | Yea et al. | 348/218.1 |
| 7,728,877 B2 * | 6/2010 | Xin et al. | 348/218.1 |
| 7,822,280 B2 * | 10/2010 | Cai et al. | 382/238 |
| 2009/0225826 A1 * | 9/2009 | Pandit et al. | 375/240.02 |
| 2010/0215100 A1 * | 8/2010 | Jeon et al. | 375/240.12 |

* cited by examiner

*Primary Examiner* — Kwang B Yao
*Assistant Examiner* — Nguyen Ngo (57) ABSTRACT

The invention relates to a method of computing a disparity, a method of synthesizing an interpolation view, a method of encoding and decoding multi-view video using the same, and an encoder and a decoder using the same. In particular, the invention relates to a method of computing a disparity, a method of synthesizing an interpolation view, a method of encoding and decoding multi-view video using the same, and an encoder and a decoder using the same, which can rapidly compute an initial disparity of a block using region segmentation, accurately compute a disparity of the block using a variable block, and synthesize an interpolation view on the basis of a disparity value computed in a pixel basis using an adaptive search range, thereby improving quality of the interpolation view, and also can encode and decode a multi-view video independently from an existing prediction mode while using the interpolation view as a reference picture, thereby improving coding efficiency.

8 Claims, 9 Drawing Sheets

METHOD OF COMPUTING DISPARITY, METHOD OF SYNTHESIZING INTERPOLATION VIEW, METHOD OF ENCODING AND DECODING MULTI-VIEW VIDEO USING THE SAME, AND ENCODER AND DECODER USING THE SAME

BACKGROUND OF THE INVENTION

1. Technical Field

The present invention relates to a method of computing a disparity, a method of synthesizing an interpolation view, a method of encoding and decoding multi-view video using the same, and an encoder and a decoder using the same. In particular, the present invention relates to a method of computing a disparity, a method of synthesizing an interpolation view, a method of encoding and decoding multi-view video using the same, and an encoder and a decoder using the same, which can rapidly compute an initial disparity of a block using region segmentation, accurately compute a disparity of the block using a variable block, and synthesize an interpolation view on the basis of a disparity value computed in a pixel basis using an adaptive search range, thereby improving quality of the interpolation view, and also can encode and decode a multi-view video independently from an existing prediction mode while using the interpolation view as a reference picture, thereby improving coding efficiency.

2. Related Art

The multi-view video technology is a new video technology that geometrically corrects and spatially combines images at different viewpoints captured by two or more cameras, thereby providing a user with various types of images. The multi-view video technology can provide the user with an image at a specified viewpoint, and can also enable the user to feel a three-dimensional effect through a wide screen. In this case, however, the amount of data to be transmitted is increased in proportion to the number of viewpoints. Accordingly, a method that can efficiently perform coding is needed. In order to solve this problem, MPEG/JVT is at present in the standardization for multi-view video coding (MVC) that can efficiently perform coding using inter-view correlation of multi-view video.

Of these, a coding scheme for view prediction generates an image having high correlation with a screen to be coded using images at neighboring viewpoints and uses the generated image in coding. As the method of synthesizing a picture at an intermediate viewpoint (hereinafter, referred to as "interpolation view"), there are known a technology that uses view warping, and a technology that uses a video interpolation method.

The view warping method generates an intermediate image using a depth image. This method can be applied when internal and external information of the cameras and accurate depth information are secured. With this method, during multi-view video coding, the depth information is also transmitted, and thus additional bit allocation is required. In addition, according to this method, since an effective interpolation view cannot be generated if the internal and external information of the cameras are not provided, an additional work to acquire the camera information is required.

The technology using the video interpolation method generates an interpolation view using a disparity in a pixel basis between the reference pictures. The video interpolation method that has been proposed until now measures the disparity in a pixel basis using block matching. Since the existing methods measure the disparity by setting a maximum disparity, like stereo matching, it is important to accurately apply the maximum disparity in measuring the prediction disparity. In case of an image having many motions, however, it is difficult to predict the motion of an object, and since the maximum disparity may be freely changed, it is difficult to predict an optimum maximum disparity. Accordingly, the above methods have a problem in that image quality is significantly changed according to how the maximum disparity is set. In addition, since the existing methods measure the disparity in a pixel basis using a fixed block, many errors occur in measuring the disparity. Particularly, an error may spread at a boundary of an object having large motion, that is, at a disparity discontinuity, and then the shape of the object having a large disparity may be distorted.

Meanwhile, the synthesized interpolation view may be used for multi-view video coding. To this end, the existing method simply adds the interpolation view to a list of reference pictures. If so, the interpolation view according to the related art has quality inferior to an original picture used for synthesis. For this reason, the interpolation view is rarely used as a reference picture during multi-view video coding, and it may increase an error rate and degrade the coding efficiency, if used.

SUMMARY OF THE INVENTION

The invention has been finalized in order to solve the above-described problems. It is an object of the invention to provide a method of computing a disparity, a method of synthesizing an interpolation view, a method of encoding and decoding multi-view video using the same, and an encoder and a decoder using the same, which can rapidly compute an initial disparity of a block using region segmentation, accurately compute a disparity of the block using a variable block, and synthesize an interpolation view on the basis of a disparity value computed in a pixel basis using an adaptive search range, thereby improving quality of the interpolation view, and also can encode and decode a multi-view video independently from an existing prediction mode while using the interpolation view as a reference picture, thereby improving coding efficiency.

According to an aspect of the invention, there is provided a method of computing a disparity between pictures. The method includes computing an initial disparity using region segmentation by extracting a feature point of each of the pictures, then hierarchically segmenting regions of the picture on the basis of the feature point, and subsequently computing the initial disparity of a primitive block in each of the segmented regions; and computing a disparity of each of pixels in the primitive block.

The feature point may be a gradient sum of the pixels in the primitive block.

The initial disparity may be computed starting with the primitive block having a larger gradient.

The method may further include computing a disparity using a variable block by computing a disparity of a sub-block having a size smaller than the primitive block, and when a difference in cost between the primitive block and the sub-block is larger than a critical value, then computing a disparity of a block having a size smaller than the sub-block.

The method may further include, after the computing of the initial disparity using the region segmentation, correcting an error in the computed disparity.

The correcting of the error in the disparity may be performed by disparity refinement or median filtering that uses a window for disparity error correction having a size larger than a block to be subject to disparity error correction.

According to another aspect of the invention, there is provided a method of synthesizing an interpolation view that synthesizes a picture at an intermediate viewpoint between multi-view pictures. The method includes: after computing a disparity between the pictures according to the method of computing a disparity, synthesizing the picture at the intermediated viewpoint using the disparity.

According to still another aspect of the invention, there is provided an encoding method that codes pictures at different viewpoints by synthesizing a picture at an intermediate viewpoint in multi-view video. The encoding method includes synthesizing a VSP picture using pictures at neighboring viewpoints; adding the synthesized VSP picture to a list of reference pictures; and predicting a motion by independently performing a VSP mode, in which coding is only made in reference to the VSP picture, and a V/T prediction mode, in which coding is only made in reference to a V picture or a T picture.

The synthesizing of the VSP picture may be performed by the method of synthesizing an interpolation view.

When a reference picture of a block to be predicted is the V picture or the T picture, prediction may be only made in reference to a block, which refers to the V picture or the T picture, among neighboring macroblocks, and when the reference picture of the block to be predicted is the VSP picture, prediction may be only made in reference to a block, which refers to the VSP picture, among neighboring macroblocks.

The VSP mode may include VSP_SKIP, VSP_16×16, VSP_8×16, VSP_16×8, and VSP_8×8.

When the VSP_SKIP mode is transmitted, vsp_skip_flag may be preferentially coded rather than skip_flag that does not refer to the VSP picture.

According to yet still another aspect of the invention, there is provided an encoder that codes pictures at different viewpoints by synthesizing a picture at an intermediate viewpoint in multi-view video. The encoder includes an interpolation view synthesis unit that synthesizes a VSP picture using pictures at neighboring viewpoints; a reference picture storage unit that adds the VSP picture synthesized by the interpolation view synthesis unit; and a motion prediction unit that independently performs a VSP mode, in which coding is only made in reference to the VSP picture, and a V/T prediction mode, in which coding is only made in reference to a V picture or a T picture.

The interpolation view synthesis unit may synthesize the VSP picture by the method of synthesizing an interpolation view.

According to yet still another aspect of the invention, there is provided a decoding method that decodes pictures at different viewpoints by synthesizing a picture at an intermediate viewpoint in multi-view video. The decoding method includes: entropy-decoding header information, including a motion vector, prediction mode information, and reference picture index information, and residual component information when a difference between a reference picture and a target picture is coded by an encoder; and distinctively compensating a motion according to whether the prediction mode is a VSP mode or a V/T prediction mode.

In the decoding method, vsp_skip_flag may be preferentially parsed rather than skip_flag.

According to yet still another aspect of the invention, there is provided a decoder that decodes pictures at different viewpoints by synthesizing a picture at an intermediate viewpoint in multi-view video. The decoder includes: an entropy decoding unit that entropy-decodes header information, including a motion vector, prediction mode information, and reference picture index information, and residual component information when a difference between a reference picture and a target picture is coded by an encoder; and a motion compensation unit that distinctively performs motion compensation according to whether the prediction mode is a VSP mode or a V/T prediction mode.

The motion compensation unit may most preferentially parse vsp_skip_flag to determine whether or not vsp_skip_flag is true, and if it is determined that vsp_skip_flag is true, compensate the motion in reference to a macroblock at the same position in the VSP picture.

DESCRIPTION OF EXEMPLARY EMBODIMENT

Hereinafter, an exemplary embodiment of the invention will be described in detail with reference to the accompanying drawings. It should be noted that the same components are represented by the same reference numerals even if they are shown in different drawings. In the embodiment of the invention, detailed description of known structures and functions incorporated herein will be omitted when it may make the subject matter of the invention unclear. Although the invention will be described in connection with the exemplary embodiment of the invention, the technical spirit of the invention is not limited to the exemplary embodiment. It will be apparent to those skilled in the art that various modifications and changes may be made without departing from the scope of the invention.

First, a method of synthesizing an interpolation view according to an embodiment of the invention will be described.

Figure 1:
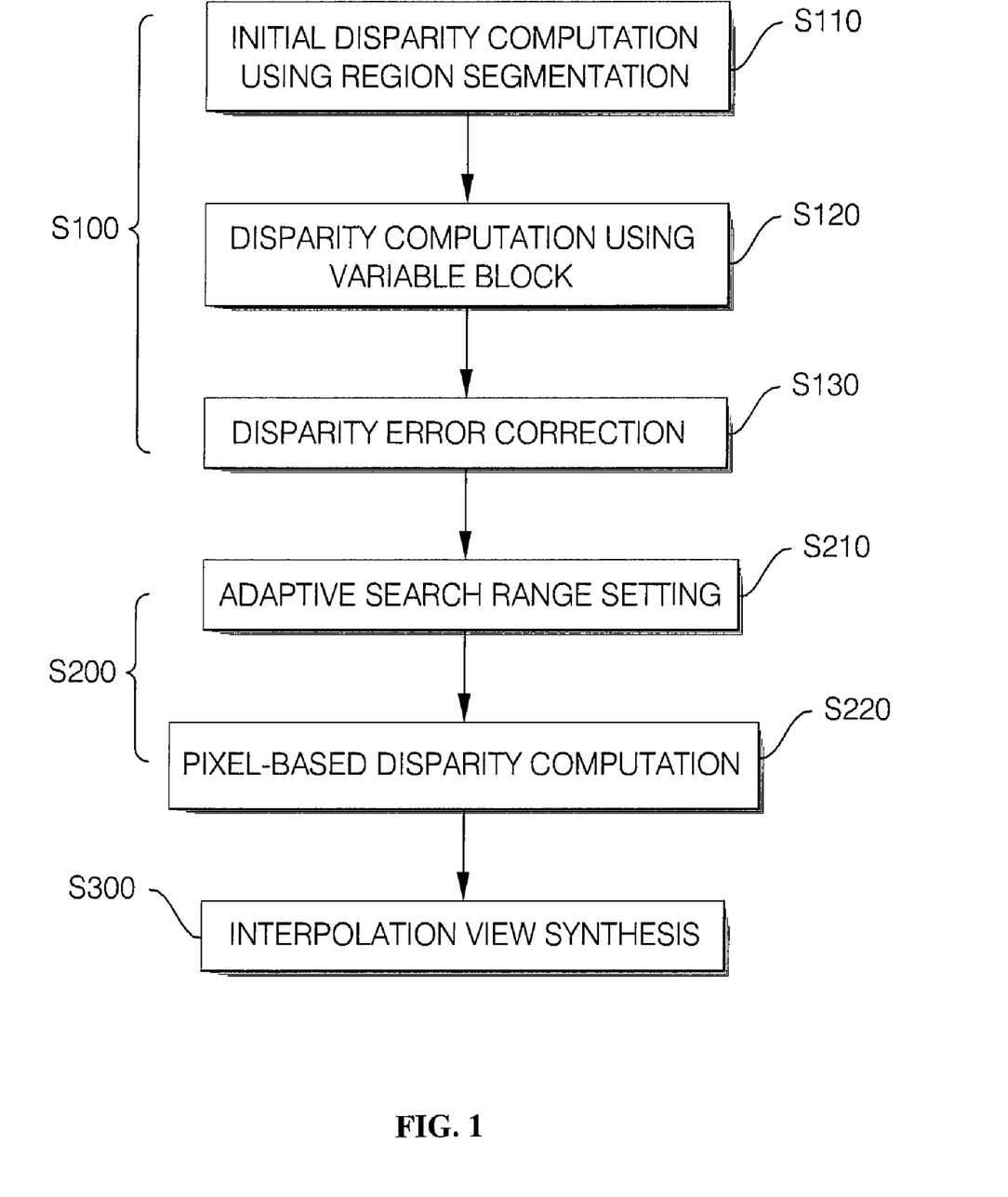
FIG. 1 is a flowchart illustrating a method of synthesizing an interpolation view according to an embodiment of the invention.
Figure 2A:
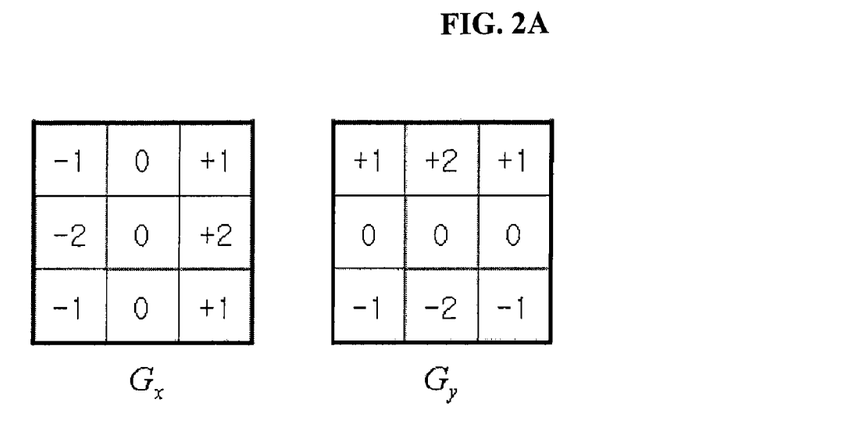
FIG. 2A is a diagram showing a mask that is used for gradient measurement.
Figure 2B:
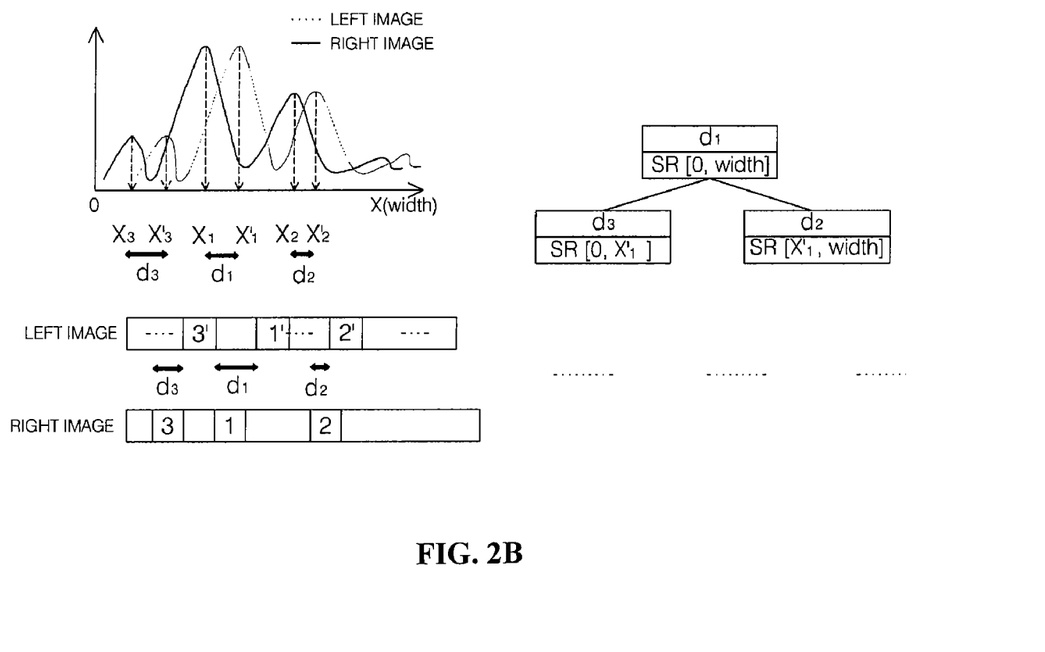
FIG. 2B is a conceptual view illustrating a method of computing an initial disparity based on a block using region segmentation.
Figure 3:
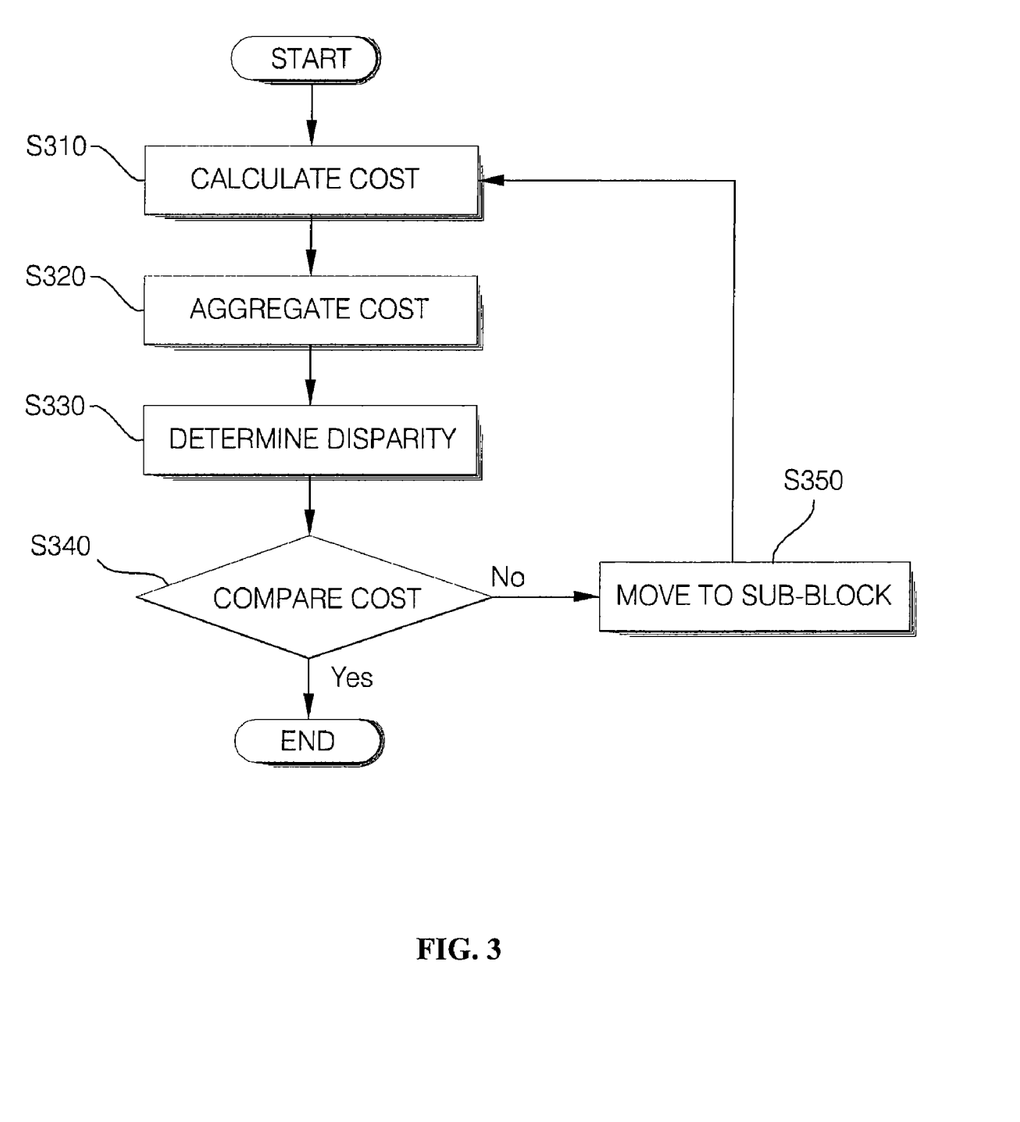
FIG. 3 is a flowchart illustrating a method of computing a disparity using a variable block.
Figure 4:
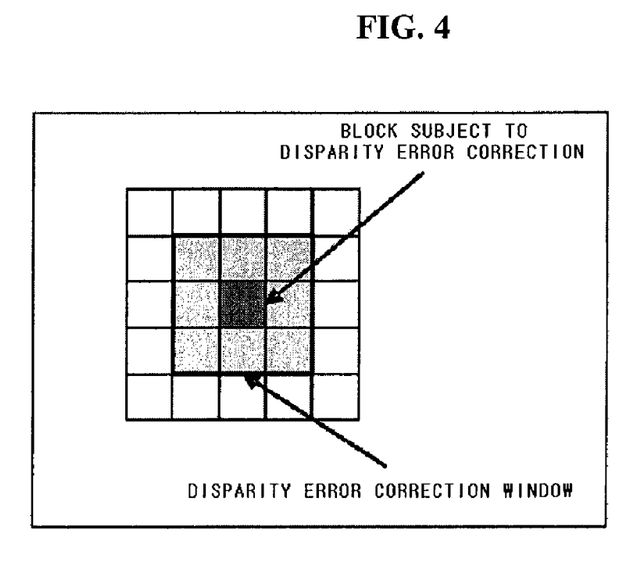
FIG. 4 is a conceptual view illustrating a disparity error correction process.
Figure 5:
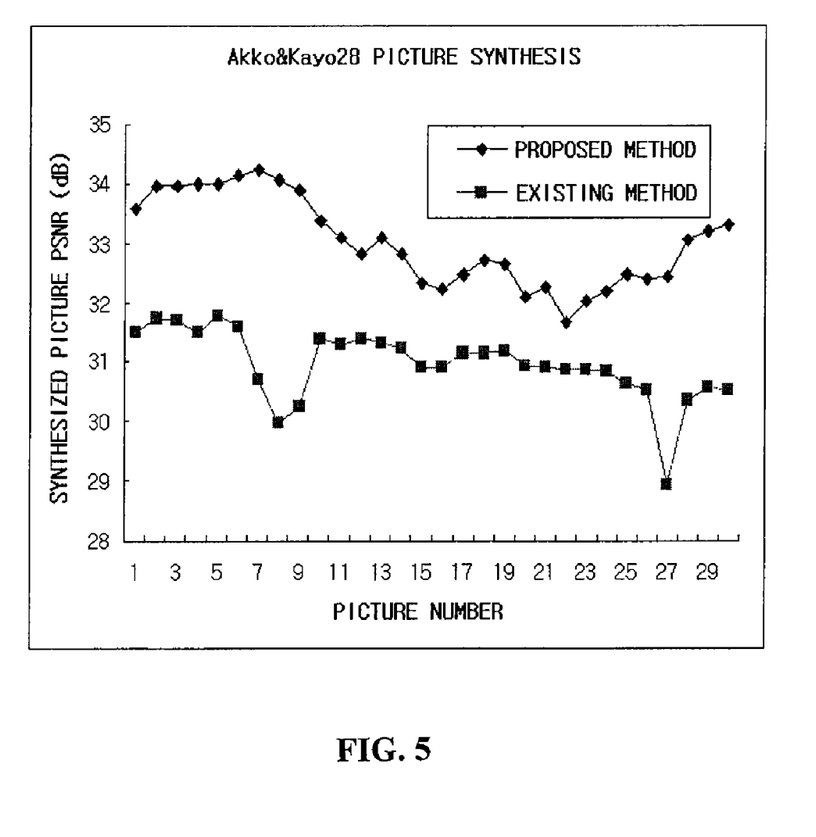
FIG. 5 is a graph showing qualities of an interpolation view by a method of synthesizing an interpolation view according to an embodiment of the invention and an interpolation view by an existing method.

FIG. 1 is a flowchart illustrating a method of synthesizing an interpolation view according to an embodiment of the invention. FIG. 2A is a diagram showing a mask that is used for gradient measurement. FIG. 2B is a conceptual view illustrating a method of computing an initial disparity based on a block using region segmentation. FIG. 3 is a flowchart illustrating a method of computing a disparity using a variable block. FIG. 4 is a conceptual view illustrating a disparity error correction process. FIG. 5 is a graph showing qualities of an interpolation view by a method of synthesizing an interpolation view according to an embodiment of the invention and an interpolation view by an existing method.

Referring to FIG. 1, a method of synthesizing an interpolation view according to an embodiment of the invention includes a block-based disparity computation step (Step S100) a pixel-based disparity computation step (Step S200), and an interpolation view synthesis step (Step S300). That is, the method of synthesizing an interpolation view according to an embodiment of the invention computes a disparity through the block-based disparity computation step (Step S100) and the pixel-based disparity computation step (Step S200), and then synthesizes an interpolation view (Step S300). In addition, the block-based disparity computation step (Step S100) includes an initial disparity computation step using region segmentation (Step S110), a disparity computation step using a variable block (Step S120), and a disparity error correction step (Step S130). Furthermore, the pixel-based disparity computation step (Step S200) includes an adaptive search range setting step (Step S210) and a pixel-based disparity computation step (Step S220).

The initial disparity computation step using region segmentation (Step S110) hierarchically sets a search range of disparities required for disparity measurement through region segmentation, and computes an initial disparity of a primitive block in each of the segmented regions. Here, the "primitive block" refers to a minimum unit for computing the initial disparity, and it may be a macroblock or a super or sub-block. Hereinafter, it is assumed that the primitive block means the macroblock.

At this time, region segmentation may be made by extracting a feature point of each picture. The feature point may be a spectral feature, a geometric feature, and a textural feature. In addition, the spectral feature may include gradient, special color or tone, and spectral parameter. The geometric feature may include edge, shape, and size. The textural feature may include pattern and spatial frequency. These feature points may be made by those skilled in the art, and the detailed descriptions thereof will be omitted. Hereinafter, it is assumed that a gradient (a differential value between intensities of neighboring pixels) is used as the feature point.

General stereo video satisfies ordering constraint that constrains the position of the object. The ordering constraint means that if a given object A is located on the left of an object B in a left image, an object A' is also located on the left of an object B' in a right image. This ordering constraint is used for the region segmentation using the gradient, like the embodiment of the invention.

First, the gradient sum for each primitive block is calculated by Equation 1.

$$|G|=|G_x|+|G_y|$$ (Equation 1)

Here, $G_x$ and $G_y$ are values that are obtained by applying a left mask and a right mask shown in FIG. 2A to a corresponding block. The masks shown in FIG. 2A are examples of a mask that is used to calculate the gradient, but different types of masks may be used. Referring to FIG. 2A, each of the blocks forming the mask has a corresponding numeric value (for convenience, referred to as "weight value").

A process of calculating $G_x$ is as follows. The left mask shown in FIG. 2A is applied such that a center block having a weight value "0" overlaps a primitive block from which the gradient is to be measured, and for nine blocks, the intensity of the primitive block, which each block overlaps, and the weight value of the mask are multiplied. The calculated value is divided by "9" to calculate an average. $G_y$ may be calculated in the same manner. In this way, the gradients for all of the primitive blocks of a left view picture (left image) and a right view picture (right image) are calculated.

The calculated gradients are graphically shown, as shown in FIG. 2B. In FIG. 2B, the horizontal axis represents a horizontal direction of the left image and the right image, that is, an image area, and the vertical axis represents the magnitude of the gradient. In addition, "left image" and "right image" below the graph represent the positions of blocks that have large gradients. Referring to FIG. 2B, due to the above-described ordering constraint, if $x_3$ is located left with respect to $x_1$ and $x_1$ is located left with respect to $x_2$ in the right image, $x'_3$ is located left with respect to $x'_1$ and $x'_1$ is located left with respect to $x'_2$ in the left image. First, a disparity of a first block having the largest gradient is calculated as $d_1(x_1 \sim x'_1)$. When a disparity of a second block having the next largest gradient is calculated, it is sufficient to search only the right portion of $x'_1$, excluding the left portion of $x'_1$. This is because if $x'_2$ is located on the right of $x_1$ according to the ordering constraint, $x'_2$ is also located on the right of $x'_1$. In this way, when a disparity $d_2(x_2 \sim x'_2)$ is computed, the search range is markedly reduced. Similarly, when a disparity of a third block having the third largest gradient is calculated, it is sufficient to search the left portion of the $x'_1$, excluding the right portion of $x'_1$.

A right side of FIG. 2B shows a disparity computation sequence and a search range (SR) for disparity computation. That is, to compute $d_1$, a full search range SR[0, width] is searched, and the result region is divided into [0, $x'_1$] and [$x'_1$, width]. Accordingly, SR[$x'_1$, width] is sufficiently used as a search range for $d_2$, and SR[0, $x'_1$] is sufficiently used as a search range for $d_3$. The same is applied to disparity computation of $d_4$ or later. As such, in the invention, a hierarchical computation range is set by the region segmentation, and thus it is not necessary to search the full region for each block. Therefore, it is possible to rapidly compute the disparity of the primitive block. In addition, rapid and accurate disparity computation can be performed, as compared with an existing method in which a manual computation range is set.

The disparity computation step using a variable block (Step S120) computes a disparity of a sub-block having a size smaller than the primitive block on the basis of the initial disparity of the primitive block computed in the initial disparity computation step using region segmentation (Step S110), and compares the costs of the primitive block and the sub-block to examine whether or not it is necessary to compute the disparity of the sub-block. That is, when a difference in cost between the primitive block and the sub-block is larger than a critical value (or threshold value), a disparity of a block having a size smaller than the sub-block is computed.

In case of block-based disparity computation, if a single object exists in the corresponding block, the computed disparity may be a representative value of all of the pixels within the block. However, various objects may exist within an image, and accordingly the boundaries of the objects overlap each other within the block. In this case, if the objects within the block have different disparities, the previously computed disparity is difficult to represent all of the pixels within the block. This situation becomes worse when a comparatively near object has many motions. When the initial disparity computed from the primitive block cannot represent all of the pixels within the primitive block, a variable block is used for accurate disparity computation.

Referring to FIG. 3, the disparity computation step using the variable block (S120) calculate the costs (Step S310), aggregates the calculated costs in a block basis (Step S320), determines disparities of a super-block and a sub-block (Step S330), compares the costs (Step S340), and determines whether or not to move to a sub-block having a smaller size (Step S350). At this time, the cost may be calculated by Equations 2A to 2D.

$$C_{W'}(x,y,d) = C_{W'}^{\overline{err}}(x,y,d) + \lambda \cdot C_{W'}^{reg}(x,y) + \gamma \cdot C^{temp}(x,y) \quad \text{(Equation 2a)}$$

Here, $C_{W'}^{\overline{err}}$ represents a mean absolute sum of differences per pixel of a block according to the computed disparities, $C_{W'}^{reg}$ represents an average disparity of neighboring pixels, and $C^{temp}$ represents a disparity at the same position of a previous picture ($\lambda$ and $\gamma$ are constants).

$$C_W^{err}(x, y, d) = \qquad \text{(Equation 2B)}$$

$$\frac{\sum_{x,y \in W} |I_L(x + \lfloor \alpha \cdot d \rfloor, y) - I_R(x + \lfloor (a-1) \cdot d \rfloor, y)|}{|W|}$$

$$C_{W'}^{reg}(x, y) = \left( \frac{D(x-1, y-1) + D(x, y-1)}{D(X+1, y) - D(x-1, y)} \right) / 4 \qquad \text{(Equation 2C)}$$

$$C^{temp}(x, y) = |D(x, y, t-1) - d| \qquad \text{(Equation 2D)}$$

If the costs of the super-block and the sub-block are calculated, whether or not a variable block is used is examined by Equation 2E. As occasion demands, block division is made in 2×2 basis as the minimum unit for disparity computation. If the disparity is computed in a 2×2 basis, a single disparity is obtained for each variable block (for example, 16×16, 8×16, 16×8, . . . , 2×2).

The cost comparison step (Step S340) is made by Equation 2E.

$$|C_{W_{upper}}(i,j,d) - C_{W_{lower}}^i(i,j,d)| < T \qquad \text{(Equation 2E)}$$

Here, the condition $$W_{upper} = \sum_{i=0}^{3} W_{lower}^i$$

is satisfied, and T is a given critical value.

Through Equation 2E, if it is determined that the difference in cost between the primitive block and the sub-block is larger than the critical value (or threshold value), a disparity of a block having a size smaller than the sub-block is computed. In this way, when the disparity discontinuity, like the boundary of the object, exists and when the initial disparity cannot represent all of the pixels of the primitive block, the disparity can be accurately computed by computing the disparity of the sub-block having a smaller size using the variable block.

The disparity error correction step (Step S130) corrects an error in the computed block disparity, thereby obtaining an accurate disparity. When the disparity is computed while the search range is hierarchically constrained, if an error occurs in disparity computation, it may affect disparity computation of the next block. To prevent this problem, several error correction methods are used. As the methods of correcting a disparity error, there are known disparity refinement, median filtering, Gaussian filtering, and noise extraction. These error correction methods may be easily implemented by those skilled in the art, and the detailed descriptions thereof will be omitted. Hereinafter, it is assumed that disparity refinement and median filtering are used as the disparity error correction method.

Referring to FIG. 4, in the disparity refinement, a disparity error correction window having a size larger than a unit block is applied to examine an internal disparity, then each disparity is applied to a block having a size 1.5 to 3 times larger than a current block so as to compute the cost, and subsequently a disparity having a minimum cost is set as a disparity of a current block. That is, the disparity error correction window is applied to a block that is to be subject to disparity error correction, and a process of finding a disparity having a minimum cost is repeatedly performed for each block. In this way, errors in the disparity computation using the region segmentation can be significantly reduced, and disparity consistency between neighboring blocks can be increased.

As described above, a disparity error per block is corrected using the disparity error correction window, and then an error per pixel is corrected using the median filtering. If the obtained disparities are analyzed after the disparity per pixel is computed, the disparities of neighboring pixels may be significantly different from each other. In addition, a difference in disparity may be significant in the picture of the same object, which is a disparity error. If noise of the disparity is eliminated using the median filtering, the extremely large disparity among the disparities of neighboring blocks or neighboring pixels is eliminated, thereby maintaining the disparity consistency. Then, the disparities of neighboring pixels become similar, and thus the spatial correlation of the synthesized interpolation view is improved.

In the adaptive search range setting step (Step S210), when the disparity per pixel is computed using the disparity per block, the disparity per pixel is easily acquired by reducing the search range. In case of the disparity per block, each unit block has a single disparity, and thus a wide computation range is not required during fine disparity computation per pixel. Accordingly, a disparity computation range per pixel is adaptively set by Equation 3. The disparity computation range SearchRange may be appropriately set. Preferably, a comparatively small value, for example, smaller than the size of the primitive block, is selected.

$$\begin{cases} MinRange = D(x, y) - SearchRange/2 \\ MaxRange = D(x, y) + SearchRange/2 \end{cases} \qquad \text{(Equation 3)}$$

Here, MinRange represents a minimum search range, MaxRange represents a maximum search range, and D(x,y) represents a block-based disparity map.

The pixel-based disparity computation step (Step S220) measures the disparities of the pixels within the block. In case of the disparity per block, a difference in disparity between the pixels is neglected due to the block size. Accordingly, to search an accurate disparity per pixel, a disparity is computed in a pixel basis using a range smaller than the block size. At this time, the search range is set by the adaptive search range setting step (Step S210).

The interpolation view synthesis step (Step S300) synthesizes the picture at the intermediate viewpoint using the disparity per pixel obtained by the above-described process. At this time, synthesis is performed using corresponding pixel values from left and right reference pictures according to the disparities of the pixels to be synthesized. As the method of synthesizing an interpolation view, Equation 4 may be used.

$$I_\alpha(x,y)=(1-\alpha)\cdot \hat{I}_L(x+\alpha\cdot D(x,y),y)+\alpha\cdot \hat{I}_R(x+(\alpha-1)\cdot D(x,y),y)$$ (Equation 4)

Equation 4 represents a pixel value when the position at the intermediate viewpoint is a on an assumption that a difference in motion and illumination between three continuous points is linear. $\hat{I}_L$ and $\hat{I}_R$ represent interpolated pixel values of the left image and the right image, respectively. In addition, if $\alpha\cdot d(x,y)$ and $(\alpha-1)\cdot d(x,y)$ are not integer numbers, $\hat{I}$ is linearly interpolated using neighboring pixel values.

The comparison result of the image qualities of the synthesized interpolation view and an existing synthesized image using the disparity per pixel is shown in Table 1. Of these, the image quality of an Akko&Kayo picture is shown in FIG. 5. In the images used in this experiment, the object takes active motions, and the disparity significantly changes. In this experiment, the size of the primitive block for disparity computation is 16×16.

TABLE 1

| Experiment | Existing Method Maximum Search Range | | | Method of the Invention Minimum Search Range | | |
|---|---|---|---|---|---|---|
| Image | 30 | 40 | 50 | 5 | 10 | 15 |
| Akko&Kayo | 27.8 | 31.5 | 30.4 | 33.0 | 32.7 | 32.3 |
| Rena | 28.4 | 27.5 | 26.4 | 32.6 | 32.7 | 32.8 |
| Ballroom | 20.7 | 21.0 | 21.4 | 25.3 | 25.3 | 25.3 |

(Akko&Kayo, Rena, and Ballroom refer to images that are recommended by the JVT standardization work group)

Referring to Table 1, the comparison result of the image qualities according to disparity search range setting is shown. Here, a synthesized image of 30 pictures is obtained using the experiment images, and the quality thereof is compared with the original image. As the experiment result, in case of the method of synthesizing an interpolation view according to an embodiment of the invention, it can be seen that the image quality is improved by approximately 1 to 4 dB.

FIG. 5 shows the comparison result of the qualities of synthesized images per picture with an Akko&Kayo image. From FIG. 5, according to the method of the invention, it can be seen that the image quality is improved by approximately 1 to 4 dB, as compared with the existing method. In addition, according to the method of computing a disparity of the invention and the method of synthesizing an interpolation view using the same, since the pixel disparity is computed on the basis of the disparity per block, a small search range is used regardless of a maximum disparity.

Then, the synthesized interpolation view has improved image quality, and thus it is used for free viewpoint video (FVV), and free viewpoint TV (FTV) such that a viewer can select a desired picture at an intermediate viewpoint. In addition, the interpolation view is used as a reference picture during multi-view video coding, thereby improving coding efficiency.

Next, an encoder and an encoding method according to an embodiment of the invention will be described.

Figure 6:
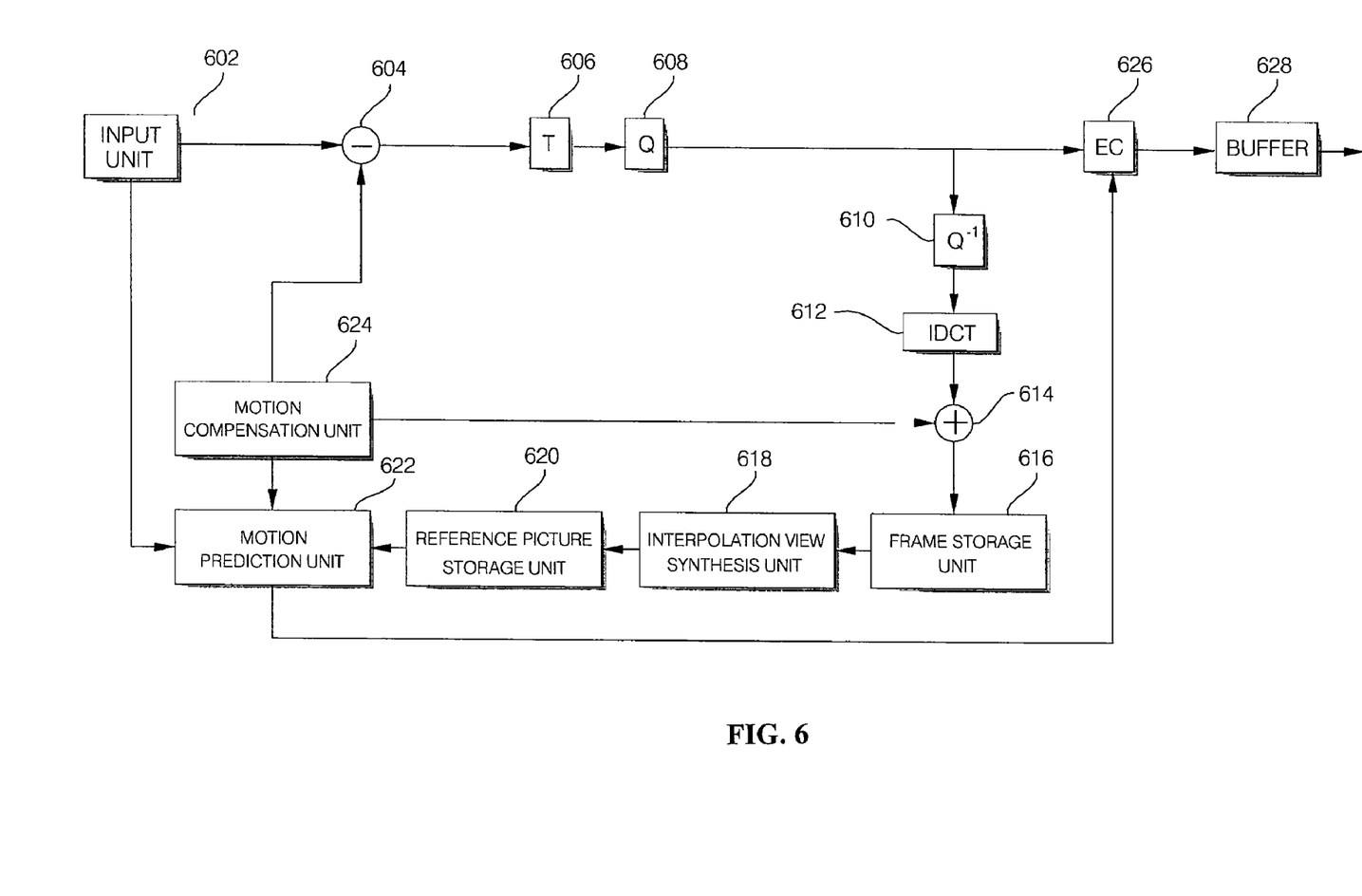
FIG. 6 is a block diagram showing an encoder according to an embodiment of the invention.
Figure 7:
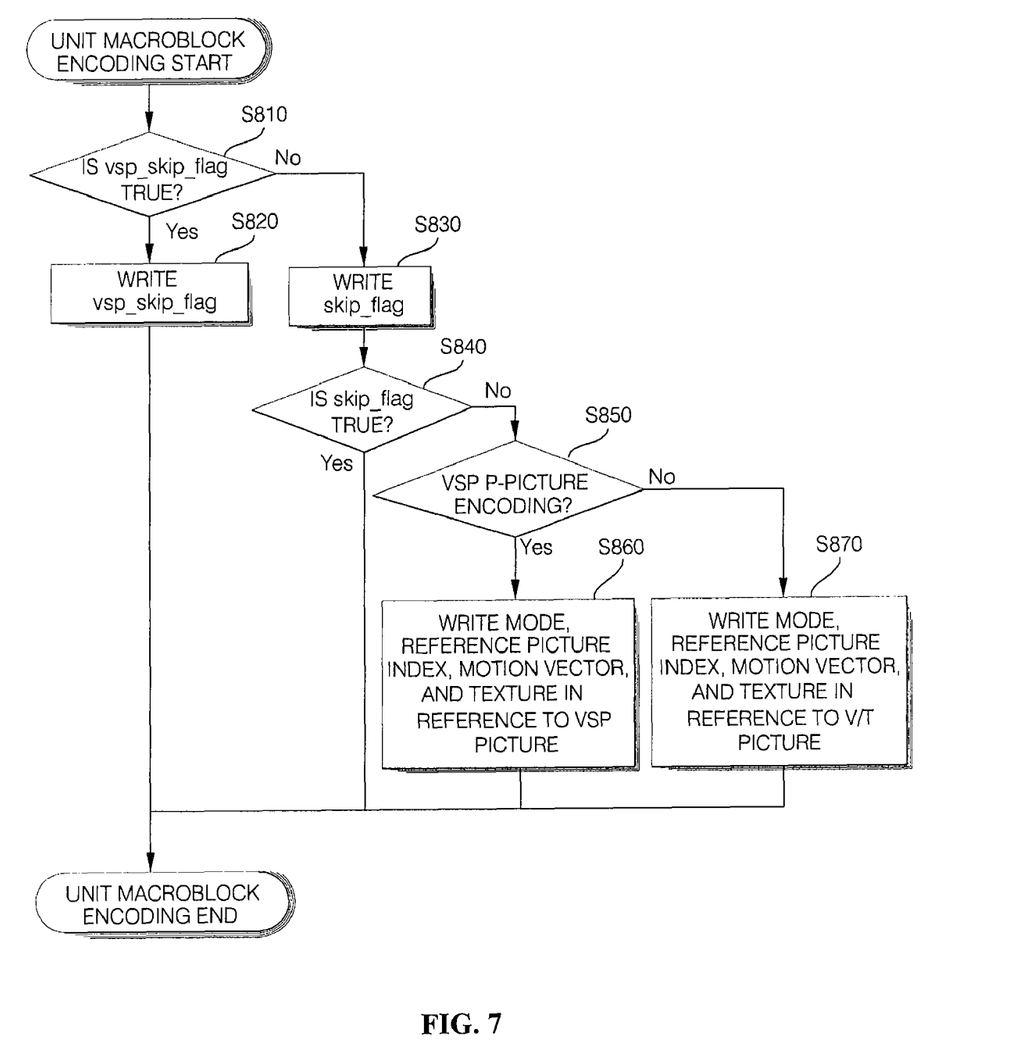
FIG. 7 is a flowchart illustrating an example where information on a VSP_SKIP mode is most preferentially coded during block coding.
Figure 8A:
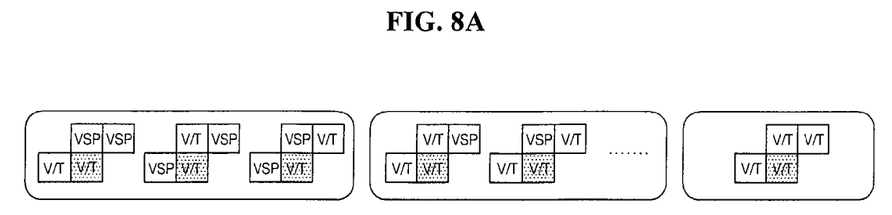
FIG. 8A is a conceptual view illustrating an example where a neighboring block is used when a reference picture of a block to be predicted is a V picture or a T picture.
Figure 8B:
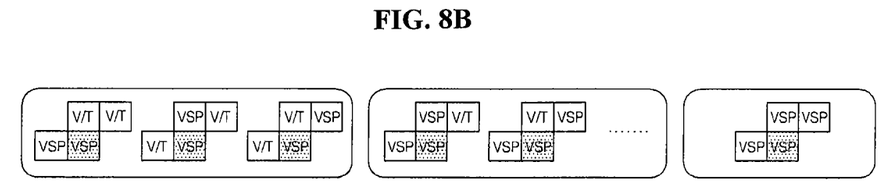
FIG. 8B is a conceptual view illustrating an example where a neighboring block is used when a reference picture of a block to be predicted is a VSP picture.

FIG. 6 is a block diagram showing an encoder according to an embodiment of the invention. FIG. 7 is a flowchart illustrating an example where information on a VSP_SKIP mode is most preferentially coded during block coding. FIG. 8A is a conceptual view illustrating an example where neighboring blocks are used when a reference picture of a block to be predicted is a V picture or a T picture. FIG. 8B is a conceptual view illustrating an example where a neighboring block is used when a reference picture of a block to be predicted is a VSP picture.

Referring to FIG. 6, an encoder according to an embodiment of the invention includes an input unit 602, a subtracter 604, a DCT UNIT 606, a quantization unit 608, an inverse quantization unit 610, an IDCT UNIT 612, an adder 614, a frame storage unit 616, an interpolation view synthesis unit 618, a reference picture storage unit 620, a motion prediction unit 622, a motion compensation unit 624, an entropy encoding unit 626, and a buffer 628. Hereinafter, a description will be given laying focus on the interpolation view synthesis unit 618, the reference picture storage unit 620, and the motion prediction unit 622. The components not described herein, which are partially defined by the H.264/AVC standard, may be easily implemented by those skilled in the art, and the detailed descriptions thereof will be omitted. In addition, the encoding method according to an embodiment of the invention includes a step of synthesizing an interpolation view using pictures at neighboring viewpoints, and a step of predicting a motion using the interpolation view. A description of the encoder according to an embodiment of the invention can also be applied to the encoding method according to an embodiment of the invention, and thus only the encoder will be hereinafter described.

The interpolation view synthesis unit 618 synthesizes the interpolation view from the pictures at neighboring viewpoints using multi-view picture data stored in the frame storage unit 616. Here, the interpolation view synthesis is preferably made by the above-described method. This is because the coding efficiency of multi-view video is excellent when a reference picture similar to a picture to be coded exists, and when a reference picture having improved quality exists. Meanwhile, it is difficult to expect the improvement in the coding efficiency of multi-view video only by adding the interpolation view having improved quality to a reference picture list. This is because, even if an interpolation view having improved quality similar to a target picture is added to the reference picture list, the interpolation view can be contributed to improve the coding efficiency only when a degree of utilization of the interpolation view is appropriately secured during prediction.

The interpolation view synthesis unit 618 synthesizes the interpolation view using the coding structure according to the H.264/AVC standard as a new video compression standard. In the H.264/AVC coding structure, a hierarchical B picture is formed in a viewpoint direction as well as a time direction, and thus redundancy between the pictures at different viewpoints is eliminated. Furthermore, pictures having high importance in the time direction are allowed to appear at regular intervals, thereby obtaining a picture having good quality at time or viewpoint when an I picture or a P picture does not exist. Hereinafter, in the H.264/AVC coding structure, a picture (reference picture or anchor picture) that only refers to a picture in the viewpoint direction, not pictures at different times, is referred to as "V picture", and a picture that refers to the V picture in the time direction is referred to as "T picture". The V picture is coded in reference to pictures at neighboring viewpoints, including the I picture, thereby enabling temporal random access. In addition, the interpolation view synthesized from a neighboring V picture or T picture is referred to as "VSP (View Synthesis Prediction) picture".

Specifically, the interpolation view synthesis unit 618 performs image interpolation after a reference image is updated in each reference picture list. For example, after a left image ((n−1)th viewpoint image) is updated in LIST_0, and a right image ((n+1)th viewpoint image) is updated in LIST_1, the interpolation view synthesis unit 618 gets a picture from each of LIST_1 and LIST_2 to perform the image interpolation and then synthesize the interpolation view.

The reason why the interpolation view is used for multi-view video coding is as follows. For example, when the B picture is coded, if the pictures at the left and right viewpoints have already been coded, the picture at the intermediate viewpoint can be generated in reference to those images. Since the generated interpolation view has the same viewpoint as the picture to be coded, it has high correlation. Accordingly, if the interpolation view is used as the reference picture for coding, the coding efficiency can be improved due to high correlation with the target picture.

The reference picture storage unit 620 adds the interpolation view synthesized by the interpolation view synthesis unit 618 to the reference picture list such that it is used as the reference picture. Specifically, the reference picture storage unit 620 stores the synthesized VSP picture, and the V picture and the T picture that are used to synthesize the VSP picture. At this time, a reference index is preferably appended to each reference picture list.

The motion prediction unit 622 calculates a motion vector by comparing the reference picture from the reference picture storage unit 620 with the target picture input from the input unit 602. At this time, the motion prediction unit 622 performs a prediction mode (hereinafter, referred to as "VSP mode"), in which coding is only made in reference to the interpolation view, independently from an existing prediction mode (hereinafter, referred to as "V/T mode"), in which coding is made in reference to the V picture or the T picture. For example, prediction is performed from the left image stored in LIST_0, prediction is performed from the right image stored in LIST_1, and two-way prediction is performed from LIST_0 and LIST_1. Subsequently, VSP prediction is separately performed from the interpolation view. In this way, the motion prediction unit 622 can use the interpolation view having high correlation with the target picture and excellent quality with predetermined frequency, thereby improving the coding efficiency.

To this end, the motion prediction unit 622 performs the VSP mode, in addition to the V/T mode. At this time, since the VSP mode only refers to the interpolated interpolation view, two-way prediction to a different reference picture is not applied, and only prediction of the P picture is applied. The VSP mode includes macroblock prediction modes, such as VSP_SKIP, VSP_16×16, VSP_16×8, VSP_8×16, and VSP_8×8. The added VSP mode only performs prediction in reference to the VSP picture.

Particularly, the VSP_SKIP mode sets the motion vector to (0, 0), refers to a macroblock at the same position, and transmits only mode information and reference picture index information without predicting the motion vector. At this time, a bit-distortion cost (RD cost) is calculated in consideration of the mode information, the reference picture index information, and the distortion. When the cost is smaller than the V/T mode, the VSP_SKIP mode is used. The modes (hereinafter, referred to as "rest mode"), excluding the VSP_SKIP mode, among the VSP modes performs motion vector prediction, like the V/T mode. Here, in the rest mode, the motion vector, the mode information, the reference picture index, and the like are transmitted. In addition, the bit-distortion cost is calculated in consideration of the mode information, the reference picture index information, residual information, and the distortion.

Meanwhile, in the coding sequence, the information on the VSP_SKIP mode is preferably transmitted earlier than the exiting SKIP mode. This is to distinguish the VSP_SKIP mode from the V/T mode. Accordingly, when the VSP_SKIP mode sufficiently occurs, it is possible to expect the improvement in the coding efficiency. To this end, there is provided a method that preferentially codes vsp_skip_flag than skip_f lag. FIG. 7 is a flowchart showing an example where the information on the VSP_SKIP mode is most preferentially coded.

First, it is determined whether or not vsp_skip_f lag of a unit macroblock to be coded is true (for example, 1) (Step S810). If vsp_skip_flag is true, vsp_skip_flag is written (Step S820), and coding is completed. In this case, only the mode information and the reference picture index are transmitted without predicting the motion vector. Meanwhile, when vsp_skip_flag is not true (for example, 0), skip_flag, which does not refer to the interpolation view, is written (Step S830), and it is determined whether or not skip_f lag is true (Step S840). As a result, if skip_flag is true, coding is completed. Otherwise, it is determined whether or not VSP P-picture coding is performed (that is, the rest mode) (Step S850), and if so, the mode information, the reference picture index, the motion vector, and texture information are written in reference to the VSP picture (Step S860), and then coding is completed. If not so, the mode information, the reference picture index, the motion vector, and the texture information are written in reference to the V picture or the T picture (Step S870), and then coding is completed.

In case of the rest mode and the V/T mode, a motion vector prediction process is performed. In the rest mode and the V/T mode, specific examples where a motion vector of a macroblock is predicted are shown in FIGS. 8A and 8B. FIG. 8A shows an example where a neighboring block is used when a reference picture of a block to be predicted is the V picture or the T picture (V/T mode). FIG. 8B shows an example where a neighboring block is used when a reference picture of a block to be predicted is the VSP picture (rest mode). In the rest mode and the V/T mode, when the motion vector is predicted, pictures that are referred to during B picture coding are broadly divided into viewpoint direction, time direction, and interpolation view. Since the motion vector distribution varies according to the pictures, it is preferable to change a motion prediction method according to the pictures in order to predict an accurate motion vector.

Referring to FIG. 8A, in case of the V/T mode, only when a reference picture of a neighboring macroblock is the V picture or the T picture (hereinafter, referred to as "V/T picture"), it is used for motion vector prediction. That is, when the reference picture is not the VSP picture, prediction is made using remaining blocks, excluding a block, which refers to the VSP picture, among neighboring macroblocks. Specifically, in a left portion of FIG. 8A, since a reference picture of a macroblock to be predicted (dark-colored block) is a V/T picture, if only a neighboring block that refers to the V/T picture is used for prediction, a single motion vector may be used. In a central portion of FIG. 8A, an average of motion vectors of two neighboring blocks is used for prediction. In addition, in a right portion of FIG. 8A, a median value of motion vectors of three neighboring blocks is used.

Referring to FIG. 8B, in the rest mode, only when the reference picture of the neighboring macroblock is the VSP picture, it is used for motion vector prediction. That is, when the reference picture is the VSP picture, prediction is only made using a block, which refers to the VSP picture, among the neighboring macroblocks. Specifically, in a left portion of FIG. 8B, since a reference picture of a macroblock to be predicted is a VSP picture, if only a neighboring block, which refers to the VSP picture, is used for prediction, a single motion vector may be used. In a central portion of FIG. 8B, an average of motion vectors of two neighboring blocks is used for prediction, and in a right portion of FIG. 8B, a median value of motion vectors of three neighboring blocks is used, as described with reference to FIG. 8A.

Next, a decoder and a decoding method according to an embodiment of the invention will be described.

Figure 9:
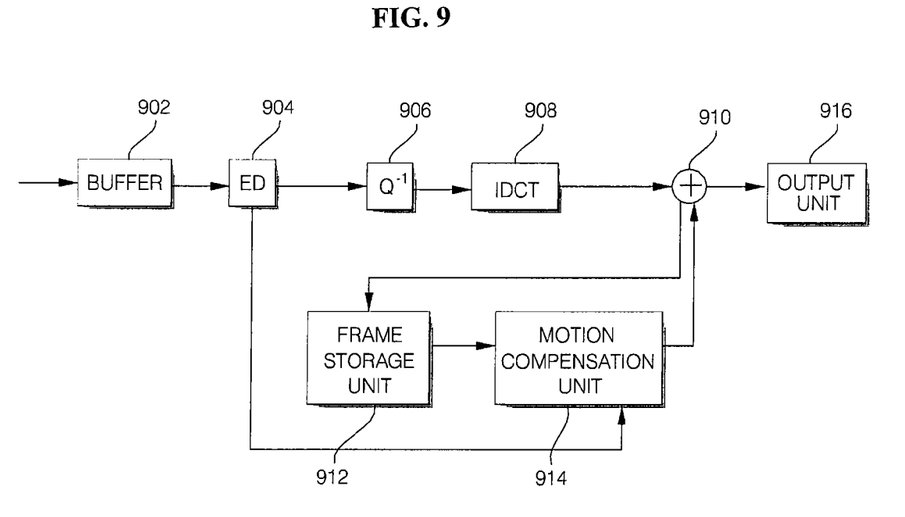
FIG. 9 is a block diagram showing a decoder according to an embodiment of the invention.
Figure 10:
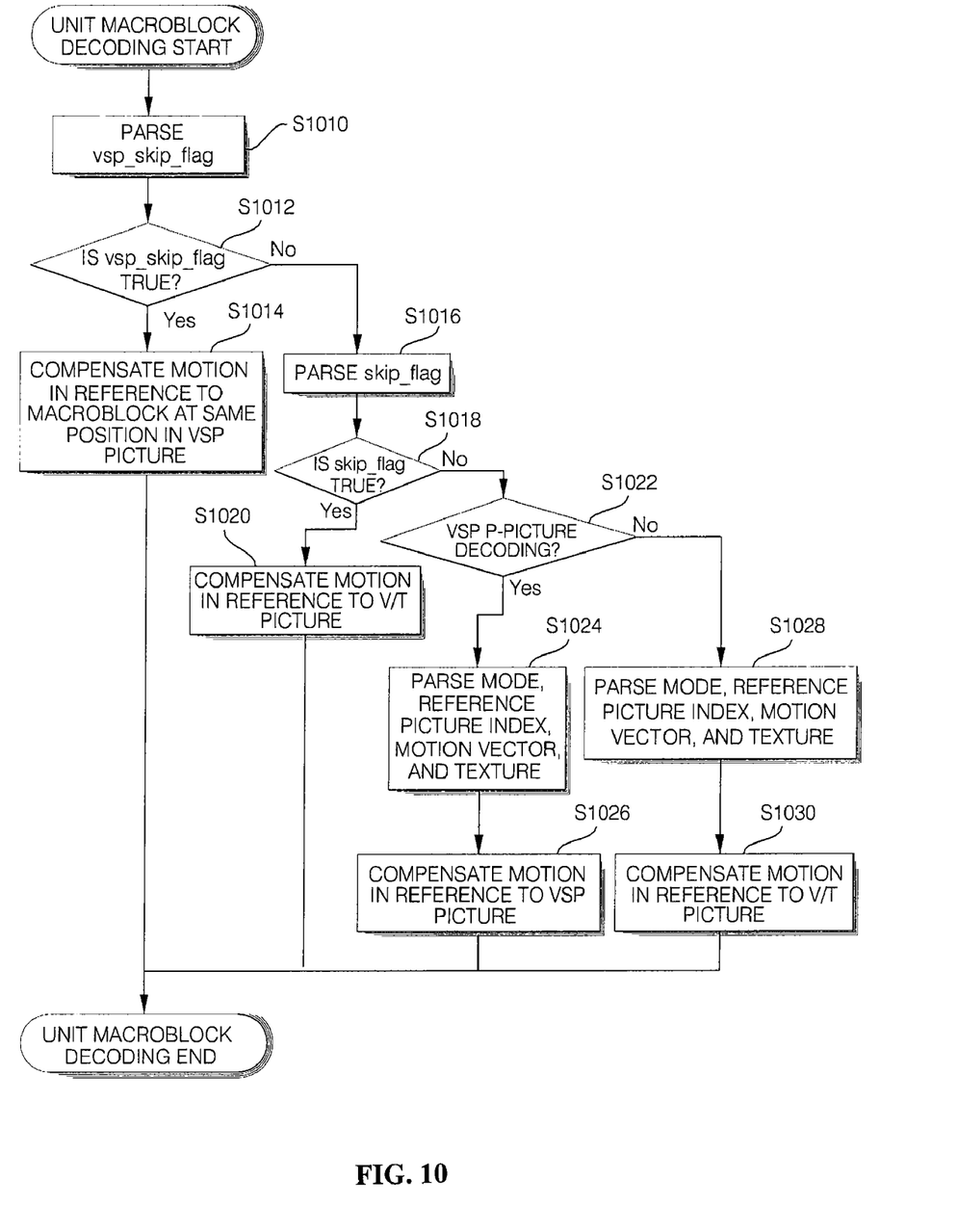
FIG. 10 is a flowchart illustrating an example where information on a VSP_SKIP mode is most preferentially decoded during block decoding.

FIG. 9 is a block diagram showing a decoder according to an embodiment of the invention. FIG. 10 is a flowchart showing an example where information on a VSP_SKIP mode is most preferentially decoded during block decoding.

Referring to FIG. 9, a decoder according to an embodiment of the invention includes a buffer 902, an entropy decoding unit 904, an inverse quantization unit 906, an IDCT unit 908, an adder 910, a frame storage unit 912, a motion compensation unit 914, and an output unit 916. Hereinafter, a description will be given laying focus on the entropy decoding unit 904 and the motion compensation unit 914. The components not described herein, which are partially defined by the H.264/AVC standard, may be easily implemented by those skilled in the art, and the detailed descriptions thereof will be omitted. In addition, the decoding method according to an embodiment of the invention includes a step of entropy-decoding header information and residual component information, and a step of compensating a motion. A description of the decoder according to an embodiment of the invention can also be applied to the decoding method according to an embodiment of the invention, and thus the decoder will be hereinafter described for simplification.

The entropy decoding unit 904 performs entropy decoding on the header information, including the motion vector, the prediction mode information, and the reference picture index information coded by the encoder, and residual component information when a difference between the reference picture and the target picture is coded by the encoder. Like the encoder, when the prediction mode is the VSP_SKIP mode, the mode information, the reference picture index information, and the like are transmitted, and when the prediction mode is the rest mode, the motion vector, the mode information, the reference picture index information, the residual component information, and the like are transmitted. In addition, in case of the V/T mode, the same information as the rest mode is transmitted. The transmitted information is decoded by the entropy decoding unit 904 and input to the motion compensation unit 914.

The motion compensation unit 914 gets a reference picture suitable for each prediction mode from the reference picture list of the frame storage unit 912 and compensates a motion. That is, when the prediction mode input from the entropy decoding unit 904 is the VSP_SKIP mode, the motion is compensated in reference to a block at the same position in the VSP picture. In the rest mode, the motion is compensated using the motion vector and the reference picture index information. In addition, in the V/T mode, similarly, the motion is compensated using the motion vector and the reference picture index information.

When the prediction mode is the VSP_SKIP mode, like the encoder, the motion compensation unit 914 preferentially parses vsp_skip_flag rather than skip_flag. FIG. 9 is a flowchart showing an example where the information on the VSP_SKIP mode is most preferentially decoded.

First, vsp_skip_flag of a unit macroblock to be decoded is parsed (Step S1010), and it is determined whether or not vsp_skip_flag is true (for example, 1) (Step S1012). If vsp_skip_flag is true, the motion is compensated in reference to a macroblock at the same position in the VSP picture (Step S1014), and then decoding is completed. In this case, there is no compensation by the motion vector. Meanwhile, when vsp_skip_flag is not true (for example, 0), skip_flag, which does not refer to the interpolation view, is parsed (Step S1016), and it is determined whether or not skip_flag is true (Step S1018). As a result, if it is determined that skip_flag is true, the motion is compensated in reference to the V/T picture (Step S1020), and then decoding is completed. If skip_flag is not true, it is determined whether or not VSP P-picture decoding is performed (that is, the rest mode) (Step S1022). If so, the mode information, the reference picture index, the motion vector, and the texture information are parsed (Step S1024), the motion is compensated in reference to the VSP picture (Step S1026), and then decoding is completed. Meanwhile, if not so, the mode information, the reference picture index, the motion vector, and the texture information are parsed (Step S1028), the motion compensation is performed in reference to the V picture or the T picture (Step S1030), and then decoding is completed.

Hereinafter, an experiment result for coding efficiency of a multi-view coding method according to an embodiment of the invention will be described.

Figure 11:
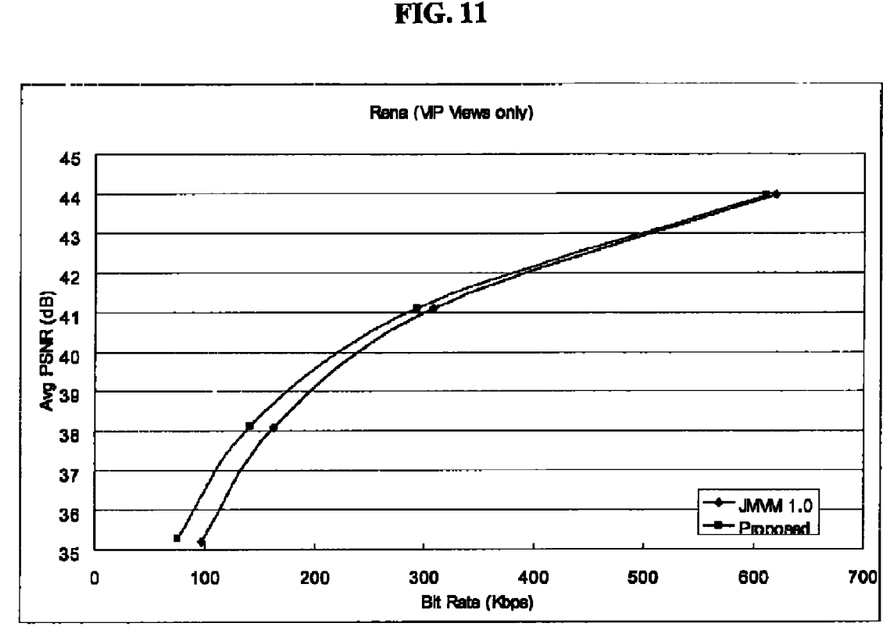
FIG. 11 is a graph showing the result of Table 2 using a bit rate-distortion curve.

Table 2 shows the comparison result of the efficiency of the coding method according to the invention with the efficiency of the existing method, the JMVM 1.0 reference program, for the 'Akko&Kayo' image. FIG. 11 is a graph showing the result of Table 2 using a bit rate-distortion curve.

TABLE 2

| QP | Bit Rate (kbps) | | PSNR (dB) | |
|---|---|---|---|---|
| | JMVM 1.0 | the Invention | JMVM 1.0 | the Invention |
| 27 | 383.25 | 357.24 | 38.82 | 38.75 |
| 32 | 222.19 | 184.67 | 35.82 | 35.80 |
| 37 | 141.43 | 100.52 | 32.92 | 33.00 |

(QP is a quantization parameter)

Figure 12:
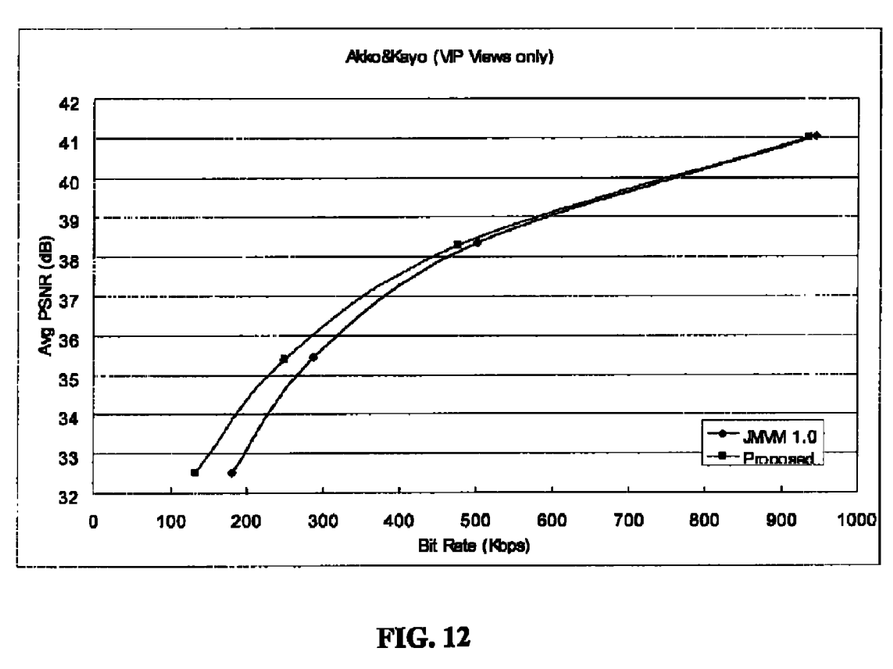
FIG. 12 is a graph showing the result of Table 3 using a bit rate-distortion curve.

Table 3 shows the comparison result of the efficiency of the coding method according to the invention with the efficiency of the existing method, the JMVM 1.0 reference program, for a 'Rena' image. FIG. 12 is a graph showing the result of Table 3 using a bit rate-distortion curve.

TABLE 3

| QP | Bit Rate (kbps) | | PSNR (dB) | |
|---|---|---|---|---|
| | JMVM 1.0 | the Invention | JMVM 1.0 | the Invention |
| 27 | 289.62 | 275.25 | 41.05 | 40.98 |
| 32 | 156.00 | 137.31 | 37.96 | 37.88 |
| 37 | 93.14 | 34.96 | 34.75 | 34.97 |

Referring to Table 2 and FIG. 11, and Table 3 and FIG. 12, it can be seen that, in both cases, the image quality is improved by approximately 0.5 dB at the same bit rate. In addition, it can be seen that, in the same image, the coding efficiency is improved at a high bit rate rather than at a low bit rate. This may be because more synthesized images are selected at the low bit rate than the high bit rate.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects. The scope of the present invention is defined by the appended claims rather than by the description preceding them, and all changes and modifications that fall within metes and bounds of the claims, or equivalents of such metes and bounds are therefore intended to be embraced by the claims.

According to the method of computing a disparity and the method of synthesizing an interpolation view of the invention, the disparity can be rapidly and accurately computed through the hierarchical disparity computation using the region segmentation and the disparity segmentation using the variable block, thereby synthesizing an interpolation view having improved image quality.

In addition, according to the encoding method and the decoding method of the invention, the existing prediction mode and the prediction mode that refers to the interpolation view are independently performed, and thus the degree of utilization of the interpolation view can be increased, thereby improving the coding efficiency.

What is claimed is:

1. An encoding method that codes pictures at different viewpoints by synthesizing a picture at an intermediate viewpoint in multi-view video, the encoding method comprising:
   computing a disparity between pictures at different viewpoints;
   synthesizing a VSP picture at the intermediate viewpoint using the computed disparity, the VSP picture being an interpolation view synthesized from a neighboring V picture or a T picture, the V picture referring to a first picture in a viewpoint direction and the T picture referring to the V picture in a time direction;
   adding the VSP picture to a list of reference pictures; and
   predicting a motion by independently performing a first mode, in which coding is made in reference to the VSP picture, and a second mode, in which coding is made in reference to the V picture or the T picture,
   wherein the computing of the disparity comprises:
      extracting a feature point of each of the pictures;
      hierarchically segmenting regions of each of the pictures on the basis of the feature point;
      computing an initial disparity of a primitive block in each of the segmented regions;
      computing a disparity of each of pixels in the primitive block;
      computing a disparity of a sub-block having a smaller size than the primitive block; and
      computing a disparity of a block having a smaller size than the sub-block when a difference in cost between the primitive block and the sub-block is larger than a threshold value.

2. The encoding method of claim 1,
   wherein, when a reference picture of a block to be predicted is the V picture or the T picture, prediction is made in reference to a block that refers to the V picture or the T picture, among neighboring macroblocks, and when the reference picture of the block to be predicted is the VSP picture, prediction is made in reference to a block that refers to the VSP picture, among the neighboring macroblocks.

3. The encoding method of claim 1,
   wherein the first mode includes VSP_SKIP, VSP__16×16, VSP 8×16, VSP 16×8, and VSP 8×8 modes.

4. The encoding method of claim 3,
   wherein, when the VSP_-SKIP mode is transmitted, vsp_skip_flag is preferentially coded rather than skip_flag that does not refer to the VSP picture.

5. An encoder that codes pictures at different viewpoints by synthesizing a picture at an intermediate viewpoint in multi-view video, the encoder comprising:
   an interpolation view synthesis unit configured to synthesize a VSP picture at the intermediate viewpoint using a disparity of pictures at neighboring viewpoints,. the VSP picture being an interpolation view synthesized from a neighboring V picture or a T picture, the V picture referring to a picture in a viewpoint direction and the T picture referring to the V picture in a time direction;
   a reference picture storage unit configured to add the VSP picture synthesized by the interpolation view synthesis unit; and
   a motion prediction unit configured to independently perform a first mode, in which coding is made in reference to the VSP picture, and a second mode, in which coding is made in reference to the V picture or the T picture,
   wherein the interpolation view synthesis unit is configured to extract a feature point of each of the pictures, hierarchically segment regions of each of the pictures on the basis of the feature point, compute an initial disparity of a primitive block in each of the segmented regions,; compute a disparity of each of pixels in the primitive block, compute a disparity of a sub-block having a smaller size than the primitive block, and compute a disparity of a block having a smaller size than the sub-block when a difference in cost between the primitive block and the sub-block is larger than a threshold value.

6. The encoder of claim 5,
   wherein, when a reference picture of a block to be predicted is the V picture or the T picture, prediction is made in reference to a block that refers to the V picture or the T picture, among neighboring macroblocks, and when the reference picture of the block to be predicted is the VSP picture, prediction is made in reference to a block that refers to the VSP picture, among the neighboring macroblocks.

7. The encoder of claim 5,
   wherein the first mode includes VSP_SKIP, $VSP_{13}$ 16×16, VSP 8×16, VSP 16×8, and VSP 8×8 modes.

8. The encoder of claim 7,
   wherein, when the VSP_SKIP mode is transmitted, vsp_skip_flag is preferentially coded rather than skip_flag that does not refer to the VSP picture.

* * * * *